US010572017B2

(12) United States Patent
Wu et al.

(10) Patent No.: US 10,572,017 B2
(45) Date of Patent: Feb. 25, 2020

(54) SYSTEMS AND METHODS FOR PROVIDING DYNAMIC HAPTIC PLAYBACK FOR AN AUGMENTED OR VIRTUAL REALITY ENVIRONMENTS

(71) Applicant: Immersion Corporation, San Jose, CA (US)

(72) Inventors: Liwen Wu, Montreal (CA); Danny A. Grant, Laval (CA); Juan Manuel Cruz-Hernandez, Montreal (CA)

(73) Assignee: Immersion Corporation, San Jose, CA (US)

( * ) Notice: Subject to any disclaimer, the term of this patent is extended or adjusted under 35 U.S.C. 154(b) by 0 days.

(21) Appl. No.: 15/958,987

(22) Filed: Apr. 20, 2018

(65) Prior Publication Data

US 2019/0324539 A1    Oct. 24, 2019

(51) Int. Cl.
  *G06F 3/01*     (2006.01)
  *G06F 3/0481*   (2013.01)

(52) U.S. Cl.
  CPC .............. *G06F 3/016* (2013.01); *G06F 3/011* (2013.01); *G06F 3/04815* (2013.01)

(58) Field of Classification Search
  CPC ....... G06F 3/016; G06F 3/011; G06F 3/04815
  See application file for complete search history.

(56) References Cited

U.S. PATENT DOCUMENTS 9,436,284 B2    9/2016  Hudin et al.
9,616,338 B1*   4/2017  Hooper ................... G06F 3/016

2005/0231480 A1*  10/2005  Kim ......................... G06F 3/016
                                                                345/163
2006/0274906 A1   12/2006  Jia et al.
2010/0245237 A1*   9/2010  Nakamura ............... A63F 13/02
                                                                345/156

(Continued)

FOREIGN PATENT DOCUMENTS

EP    2674835 A2    12/2013
EP    2728443 A2    5/2014

OTHER PUBLICATIONS

EP 19170246.3, "Extended European Search Report," dated Sep. 6, 2019, 11 pages.

*Primary Examiner* — Ryan W Sherwin
(74) *Attorney, Agent, or Firm* — Kilpatrick Townsend & Stockton LLP (57) ABSTRACT

One illustrative system disclosed herein includes a computing device that comprises a memory and a processor in communication with the memory. The system also includes an xPC target machine that is capable of achieving sampling rates of at least 100 khz and in communication with the computing device and a user device that includes a sensor and a haptic output device. The processor generates a simulate reality environment and determines a haptic effect based on the simulated reality environment or a sensor signal from the sensor. The processor transmits data about a parameter of the haptic effect or the sensor signal to the xPC target machine, which determines the parameter of the haptic effect and generates, in substantially real time, a haptic signal. The xPC target machine transmits the haptic signal to the haptic output device, which is configured to receive the haptic signal and output the haptic effect.

20 Claims, 4 Drawing Sheets

(56) References Cited

U.S. PATENT DOCUMENTS

| | | | |
|---|---|---|---|
| 2012/0065784 A1* | 3/2012 | Feldman | G06F 3/016 700/280 |
| 2015/0316985 A1* | 11/2015 | Levesque | G06T 19/006 345/156 |
| 2016/0262608 A1* | 9/2016 | Krueger | A61B 3/0041 |
| 2018/0284896 A1* | 10/2018 | Kearney | G06F 3/011 |
| 2018/0299957 A1* | 10/2018 | Israr | G06F 3/016 |
| 2018/0314330 A1* | 11/2018 | Ryu | G06F 3/011 |

* cited by examiner

SYSTEMS AND METHODS FOR PROVIDING DYNAMIC HAPTIC PLAYBACK FOR AN AUGMENTED OR VIRTUAL REALITY ENVIRONMENTS

FIELD OF INVENTION

The present disclosure relates generally to user interface devices. More specifically, but not by way of limitation, this disclosure relates to providing dynamic haptic playback or effects for an augmented or virtual reality environment in substantially real time.

BACKGROUND

Augmented reality ("AR") devices provide an augmented reality environment in which physical objects or "real world" objects are concurrently displayed with virtual objects in a virtual space. Similarly, virtual reality ("VR") devices can be used to create a VR environment that can simulate a user's physical presence in the VR environment. A user of the AR or VR device can view the AR or VR environment and look at, or interact with, virtual objects in the AR or VR environment. Some AR or VR devices, however, may lack haptic feedback capabilities. Moreover, some AR or VR devices may not provide static haptic feedback or playback (e.g., a predetermined haptic effect based on the user's interaction with the AR or VR environment) and dynamic haptic feedback or playback (e.g., one or more haptic effects that change over time as the user interacts with the AR or VR environment). Furthermore, some AR or VR devices may not provide haptic feedback or playback in substantially real time (e.g., a haptic effect that is perceived in substantially real time as the user interacts with the AR or VR environment).

SUMMARY

Various embodiments of the present disclosure provide systems and methods for providing dynamic haptic playback or effects for an augmented or virtual reality environment in substantially real time.

In one embodiment, a system comprises a user device comprising a sensor configured to capture information indicating an interaction of a user or biological or biometric information about the user or any information about the user's environment. The user device further comprises a haptic output device. The system further comprises a computing device comprising a first processing device and a non-transitory computer-readable medium communicatively coupled to the first processing device. The first processing device is configured to perform operations comprising: generating a simulated reality environment; receiving, from the sensor, a sensor signal indicating the information about the user; determine a haptic effect based on the simulated reality environment or the sensor signal; and transmitting data about a parameter of the haptic effect or the sensor signal to an xPC target machine. The system further comprises the xPC target machine that is capable of achieving sampling rates up to at least 20 kHz or sampling rates of at least 100 khz or higher and comprises a second processing device that is configured to determine the parameter of the haptic effect. The second processing device is also configured to generate, in substantially real time as the xPC target machine receives the data about the parameter of the haptic effect or the sensor signal, a haptic signal associated with the haptic effect, wherein the haptic signal has a frequency between approximately 1 Hz and 20 kHz. The second processing device is also configured to transmit the haptic signal associated with the haptic effect to the haptic output device configured to receive the haptic signal and output the haptic effect.

These illustrative embodiments are mentioned not to limit or define the limits of the present subject matter, but to provide examples to aid understanding thereof. Illustrative embodiments are discussed in the Detailed Description, and further description is provided there. Advantages offered by various embodiments may be further understood by examining this specification and/or by practicing one or more embodiments of the claimed subject matter.

BRIEF DESCRIPTION OF THE DRAWINGS

A full and enabling disclosure is set forth more particularly in the remainder of the specification. The specification makes reference to the following appended figures.

DETAILED DESCRIPTION

Reference now will be made in detail to various and alternative illustrative embodiments and to the accompanying drawings. Each example is provided by way of explanation and not as a limitation. It will be apparent to those skilled in the art that modifications and variations can be made. For instance, features illustrated or described as part of one embodiment may be used in another embodiment to yield a still further embodiment. Thus, it is intended that this disclosure includes modifications and variations that come within the scope of the appended claims and their equivalents.

Illustrative Examples of Providing Dynamic Haptic Playback or Effects for an Augmented or Virtual Reality Environment in Substantially Real Time One illustrative embodiment of the present disclosure comprises a computing device that includes a memory and a processor in communication with the memory. The computing device is communicatively coupled to a user device, such as a wearable device that comprises a sensor. In this example, the computing device and the user device can each be communicatively coupled to an xPC target machine or device that includes a memory comprising an xPC target module and a processor in communication with the memory. In some examples, an xPC target machine or device includes any device that can be configured for cross-process or inter-process communication (e.g., between one or more devices). In some instances, the xPC target machine can obtain data from the computing device and the user device and process or analyze the data in substantially real time.

In the illustrative embodiment, the computing device can generate and output a simulated reality environment (e.g., a virtual or augmented reality environment) and a user of the user device can interact with the simulated reality environment using the user device. In this example, the computing device can capture data about the simulated reality environment and/or the user's interaction with the simulated reality environment. For example, the processor of the computing device can capture data about the simulated reality environment (e.g., when the user presses or touches a virtual object in the simulated reality environment). The sensor of the user device can capture information about the user's interaction with the simulated reality environment (e.g., data about a motion of the user's body part, user input, or any other interaction with the simulated reality environment) and transmit a signal indicating the captured information about the user's interaction with the simulated reality environment to the processor of the computing device. The processor of the computing device can determine one or more parameters of one or more haptic effect based at least in part on the data about the simulated reality environment or the user's interaction with the simulated reality environment.

In this example, the xPC target module can include instructions that cause the xPC target machine to obtain (e.g., receive) data about one or more parameters of one or more haptic effects and/or the sensor data obtained from the sensor of the user device from the processor of the computing device. The xPC target machine can generate a haptic signal based on the parameter of the haptic effect and transmit the haptic signal to a haptic output device associated with the user device. The haptic output device is configured to receive the haptic signal and output one or more haptic effects based on the haptic signal.

As an example, as the user is interacting with the simulated reality environment, the user can tap a virtual object in the simulated reality environment (e.g., to provide user input to select the virtual object). In this example, the processor of the computing device can obtain data indicating that the user is tapping the virtual object. The processor can determine a parameter of a haptic effect associated with the user tapping the virtual object. For instance, the processor can determine that a static haptic effect is associated with the user tapping the virtual object. A static haptic effect can be a predetermined haptic effect such as, for example, a haptic effect having a predetermined characteristic (e.g., a predetermined magnitude, duration, location, type, pitch, frequency, etc.). Continuing with this example, the processor can transmit data about the static haptic effect or a parameter of the static haptic effect to the xPC target machine, which can process the data in substantially real time and generate a haptic signal associated with the static haptic effect and transmit the haptic signal to the haptic output device, which can output the static haptic effect in response to receiving the haptic signal.

In this example, the user can continue to interact with the simulated reality environment and the sensor of the user device can be a pressure sensor that detects an amount of pressure of the user's contact with the virtual object in the simulated reality environment or a change in the amount of pressure of the user's contact. The sensor transmits one or more signals indicating the amount of pressure or the change in pressure to the processor in substantially real time as the sensor captures information about the amount of pressure or the change in the amount of pressure. The processor can then determine a parameter of a haptic effect associated with the amount of pressure or the change in pressure. For instance, the processor can determine that one or more dynamic haptic effects are associated with the amount of pressure of the user's contact with the virtual object or the change in the amount of pressure. In some examples, a dynamic haptic effect can include one or more haptic effects that can change or vary based on data captured by the sensor (e.g., change based on sensor data indicating the amount of pressure of the user's contact or changes in the amount of pressure). Continuing with this example, the processor can transmit data about the dynamic haptic effect or a parameter of the dynamic haptic effect to the xPC target machine, which can process the data in substantially real time and generate one or more haptic signals associated with the dynamic haptic effect and transmit the haptic signal to the haptic output device, which can output the dynamic haptic effect in response to receiving the haptic signal.

In this manner, the xPC target machine can be communicatively coupled to the computing device and the user device to obtain data and process or analyze the data in substantially real time to generate haptic signals such that the haptic output device can output a static or dynamic haptic effect in substantially real time. In some instances, the xPC target machine can be a computing device, server, device, etc. that can be capable of achieving sampling rates up to at least 20 kHz or sampling rates of at least 100 khz, which can allow the xPC target machine to process data from the computing device or the user device in real time and generate, in substantially real time, one or more haptic signals having a frequency in a range between approximately 1 Hz and 20 kHz. As example, xPC target machine can process data from the computing device or the user device in real time and generate a haptic signal having a frequency of approximately 1 kHz.

While in this example, the xPC target machine and the user device are described as separate systems, the present disclosure is not limited to such configurations. Rather, in other examples, the user device and the xPC target machine are part of a single system and the xPC target machine can receive sensor signals from the sensor of the user device.

In this manner, the systems and methods described herein can generate and provide high definition dynamic or static haptic playback (e.g., effects) for an augmented or virtual reality environment in substantially real time.

These illustrative examples are given to introduce the reader to the general subject matter discussed here and are not intended to limit the scope of the disclosed concepts. The following sections describe various additional features and examples with reference to the drawings in which like numerals indicate like elements, and directional descriptions are used to describe the illustrative examples but, like the illustrative examples, should not be used to limit the present disclosure.

Figure 1:
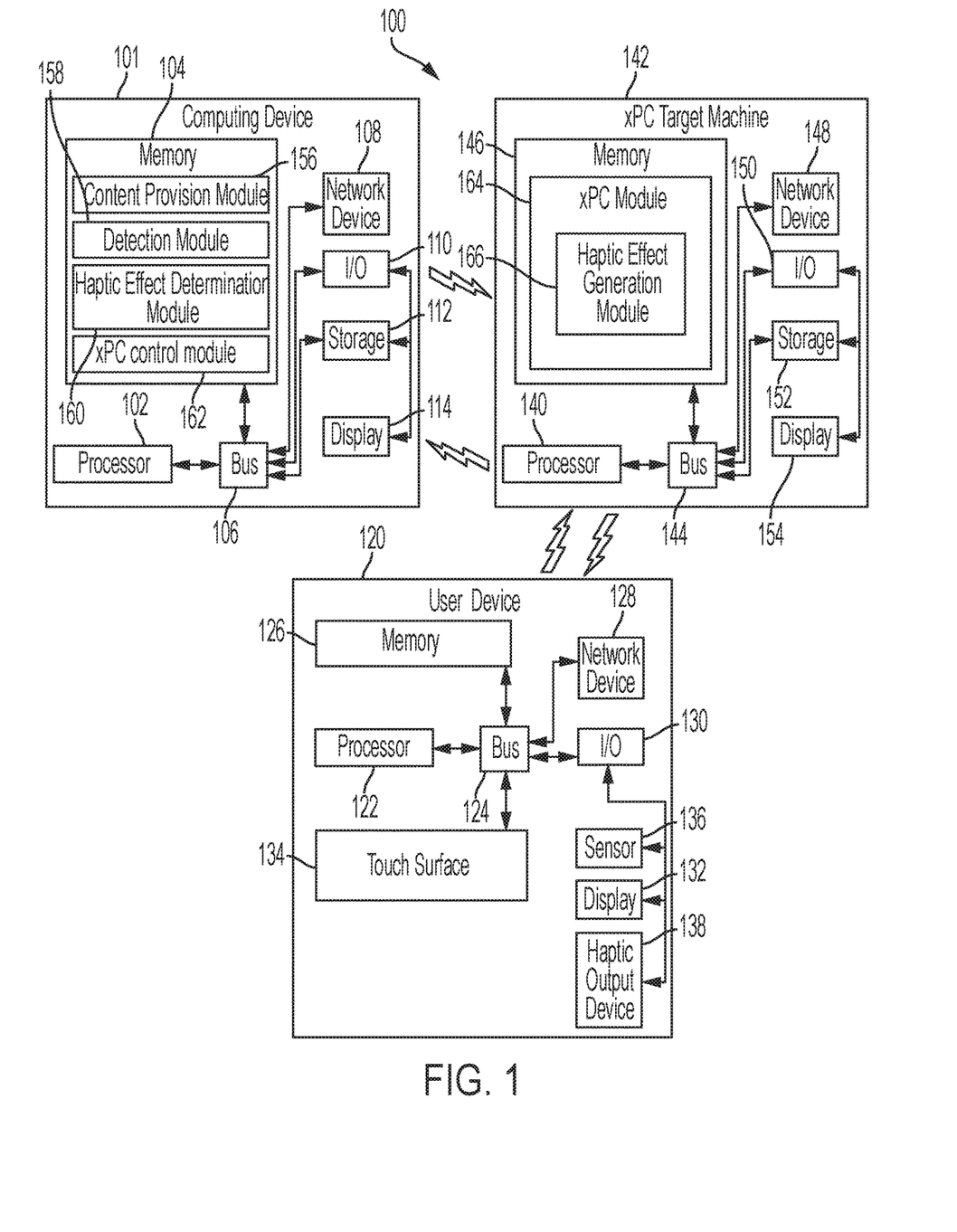
FIG. 1 is a block diagram showing a system for providing dynamic haptic playback or effects for an augmented or virtual reality environment in substantially real time according to one embodiment.

Illustrative Examples of a System for Providing Dynamic Haptic Playback or Effects for an Augmented or Virtual Reality Environment in Substantially Real Time FIG. 1 is a block diagram showing a system 100 for providing dynamic haptic playback or effects for an augmented or virtual reality environment in substantially real time according to one embodiment. In the embodiment depicted in FIG. 1, the system 100 comprises a computing device 101 (e.g., host device) having a processor 102 in communication with other hardware via a bus 106. The computing device 101 may comprise, for example, a personal computer, a mobile device (e.g., a smartphone), tablet, etc. In some embodiments, the computing device 101 may include all or some of the components depicted in FIG. 1.

A memory 104, which can comprise any suitable tangible (and non-transitory) computer-readable medium such as random access memory ("RAM"), read-only memory ("ROM"), erasable and programmable read-only memory ("EEPROM"), or the like, embodies program components that configure operation of the computing device 101. In the embodiment shown, computing device 101 further includes one or more network interface devices 108, input/output (I/O) interface components 110, and storage 112.

Network interface device 108 can represent one or more of any components that facilitate a network connection. Examples include, but are not limited to, wired interfaces such as Ethernet, USB, IEEE 1394, and/or wireless interfaces such as IEEE 802.11, Bluetooth, or radio interfaces for accessing cellular telephone networks (e.g., transceiver/antenna for accessing a CDMA, GSM, UMTS, or other mobile communications network).

I/O components 110 may be used to facilitate wired or wireless connections to devices such as one or more displays 114, game controllers, keyboards, mice, joysticks, cameras, buttons, speakers, microphones and/or other hardware used to input or output data. Storage 112 represents nonvolatile storage such as magnetic, optical, or other storage media included in computing device 101 or coupled to the processor 102.

The system 100 further comprises a user device 120 (e.g., a local device) that can be, for example, a mobile device (e.g., a smartphone), smartwatch, a head-mounted display, a wearable device, a handheld device (e.g., a tablet, video game controller), or any other type of user interface device. In some examples, the user device 120 can be any type of user interface device that a user can use to interact with a simulated reality environment (e.g., an augmented or virtual reality environment).

The user device 120 can include a processor 122 in communication with other hardware via a bus 124. The user device 120 can also include a memory 126, network interface device 128, I/O components 130, and a display 132 each of which can be configured in substantially the same manner as the memory 104, network interface device 108, I/O components 110, and display 114, although they need not be.

In some embodiments, the user device 120 comprises a touch surface 134 (e.g., a touchpad or touch sensitive surface) that can be communicatively connected to the bus 124 and configured to sense tactile input of a user. While in this example, the user device 120 includes a touch surface 134 that is described as being configured to sense tactile input of a user, the present disclosure is not limited to such configurations. Rather, in other examples, the user device 120 can include the touch surface 134 and/or any surface that may not be configured to sense tactile input.

In some examples, the user device 120 comprises a touch-enabled display that combines the touch surface 134 and the display 132 of the user device 120. The touch surface 134 may be overlaid on the display 132, may be the display 132 exterior, or may be one or more layers of material above components of the display 132. In other embodiments, the user device 120 may display a graphical user interface ("GUI") that includes one or more virtual user interface components (e.g., buttons) on the touch-enabled display and the touch surface 134 can allow interaction with the virtual user interface components.

In some embodiments, the user device 120 comprises one or more sensors 136. In some embodiments, the sensor 136 may comprise, for example, gyroscope, an accelerometer, imaging sensor, a camera, magnetometer, microphone, temperature sensor, force sensor, pressure sensor, heart rate sensor, insulin sensor, pulse sensor, an inertial measurement unit, an electroencephalogram, and/or other sensor that can detect, monitor, or otherwise capture any information about a user or an interaction of the user. For example, the sensor 136 can be any sensor that can capture information about the user's motion or the user's motion of the user device 120 as the user interacts with the simulated reality environment or information about the environment of the user. As another example, the sensor 136 can be a pressure sensor that captures information about an amount of pressure of the user's contact with a virtual object in the simulated reality environment or a change in the amount of pressure of the user's contact. In some examples, the sensor 136 can be configured to capture any information indicating an interaction of a user, biological or biometric information about the user, information about the user's real or virtual environment, or any other information about the user.

The user device 120 further comprises a haptic output device 138 in communication with the processor 122 or a processor 140 of an xPC target machine 142. The haptic output device 138 is configured to output a haptic effect in response to a haptic signal. For example, the haptic output device 138 can output a haptic effect in response to a haptic signal from the processor 140 of the xPC target machine 142. As another example, the processor 122 of the user device 120 can receive a haptic signal from the processor 140 of the xPC target machine 142 and the processor 122 can transmit the haptic signal to the haptic output device 138. In some embodiments, the haptic output device 118 is configured to output a haptic effect comprising, for example, a vibration, a squeeze, a poke, a change in a perceived coefficient of friction, a simulated texture, a stroking sensation, an electro-tactile effect, a surface deformation (e.g., a deformation of a surface associated with the user device 120), and/or a puff of a solid, liquid, or gas. Further, some haptic effects may use multiple haptic output devices 138 of the same or different types in sequence and/or in concert.

Although a single haptic output device 138 is shown in FIG. 1, some embodiments may use multiple haptic output devices 138 of the same or different type to produce haptic effects. In some embodiments, the haptic output device 138 is internal to the user device 120 and in communication with the xPC target machine 142 (e.g., via wired interfaces such as Ethernet, USB, IEEE 1394, and/or wireless interfaces such as IEEE 802.11, Bluetooth, or radio interfaces). For example, the haptic output device 138 may be associated with (e.g., coupled to or within) the user device 120 and configured to receive haptic signals from the processor 140 or the processor 122.

The haptic output device 138 may comprise, for example, one or more of a piezoelectric actuator, an electro-active polymer, a macro fiber composite (MFC) element, etc. As used herein, the term "MFC element" is used to refer to a component or element that acts as both an actuator and a sensor. In some examples, the term "MFC element" can be used to refer to a transducer that uses energy to output a haptic effect or receives energy as an input. For example, the MFC element can be used as a sensor when the MFC element is pressed, touched, bended, etc. In this example, when the MFC element is pressed, touched, bended, etc., one or more actuator leads or terminals of the MFC element can carry a voltage that can be detected, amplified, analyzed, etc. by a microcontroller.

The system 100 further comprises the xPC target machine 142, which includes a processor 140 in communication with other hardware via a bus 144. The xPC target machine 142 may comprise, for example, a personal computer or other device. The xPC target machine 142 can also include a memory 146, network interface device 148, I/O components 150, a storage 152, and a display 154 each of which can be configured in substantially the same manner as the memory 104, network interface device 108, I/O components 110, storage 112, and display 114, although they need not be.

Turning to memory 104 of the computing device 101, modules 156, 158, 160, and 162 are depicted to show how a device can be configured in some embodiments to provide dynamic haptic playback or effects for an augmented or virtual reality environment in substantially real time. In some embodiments, modules 156, 158, 160, and 162 may comprise processor executable instructions that can configure the processor 102 to perform one or more operations.

For example, a content provision module 156 includes instructions that can be executed by the processor 102 to provide content (e.g., texts, images, sounds, videos, characters, virtual objects, virtual animations, etc.) to a user (e.g., a user of the computing device 101 or the user device 120). If the content includes computer-generated images, the content provision module 156 includes instructions that, when executed by the processor 102, cause the processor 102 to generate the images for display on a display device (e.g., the display 114 of the computing device 101 or another display communicatively coupled to the processor 102). If the content includes video and/or still images, the content provision module 156 includes instructions that, when executed by the processor 102, cause the processor 102 to access the video and/or still images and generate views of the video and/or still images for display on the display 114. If the content includes audio content, the content provision module 156 includes instructions that, when executed by the processor 102, cause the processor 102 to generate electronic signals that will drive a speaker, which may be part of the display 114, to output corresponding sounds. In some embodiments, the content, or the information from which the content is derived, may be obtained by the processor 102 from the storage 112, which may be part of the computing device 101, as illustrated in FIG. 1, or may be separate from the computing device 101 and communicatively coupled to the computing device 101.

As an example, the content provision module 156 can include instructions that, when executed by the processor 102, cause the processor 102 to generate a simulated reality environment for display on display 114. The simulated reality environment can include an environment that is partially or entirely virtual. For example, the simulated reality environment can include an augmented reality environment, a virtual reality environment, a video game environment, etc. As an illustrative example, the processor 102 can generate a virtual or augmented reality environment associated with a video game on the display 114. The simulated reality environment can simulate a user's physical presence and/or environment and can include virtual objects (e.g., characters, vehicles, buttons, sliders, knobs, icons, or other user interface components) with which a user of the computing device 101 may interact using the user device 120. For example, the user device 120 may be a game controller, ring, keyboard, mouse, joystick, etc., with which the user can interact with the simulated reality environment and the user device 120 can be communicatively coupled to the computing device 101 via network device 108 and network device 128. The processor 102 may receive signals from the user device 120 via network device 108 and network device 128 and determine an interaction with and/or manipulation of a virtual object within the simulated reality environment based on the signals. The processor 102 may cause the interaction and/or manipulation to occur within the simulated reality environment. Thus, the user may be able to interact with or manipulate virtual objects in the simulated reality environment via the user device 120.

A detection module 158 can configure the processor 102 to receive sensor signals from the sensor 136. As an example, the detection module 158 can include instructions that, when executed by the processor 102, cause the processor 102 to receive a sensor signal from the sensor 136 when the sensor 136 detects or senses a motion of the user of the user device 120 or a motion of the user device 120. As an example, the processor 102 can receive a sensor signal from the sensor 136 when the sensor 136 detects the user's interaction with a simulated reality environment using the user device 120. For instance, the detection module 158 can include instructions that, when executed by the processor 102, cause the processor 102 to receive a sensor signal from the sensor 136 when the sensor 136 captures information about the user's motion of the user device 120 as the user interacts with the simulated reality environment. As another example, the detection module 158 can include instructions that, when executed by the processor 102, cause the processor 102 to receive a sensor signal from the sensor 136 when the sensor 136 captures information about an amount of pressure of the user's contact with a virtual object in the simulated reality environment or a change in the amount of pressure of the user's contact. In some examples, the sensor signal from the sensor 136 can include information about the user's motion or the motion of the user device 120 including, including, but not limited to, a path, velocity, acceleration, force, etc. of the user's motion or motion of the user device 120 and/or any other information about the user or the user device 120. In some examples, a sensor signal from the sensor 136 can include information about a parameter (e.g., condition) of the user's real or simulated environment including, but not limited to, a temperature, humidity, latitude, etc. of the user's real or virtual environment. In some examples, the processor 102 can receive one or more sensor signals from the sensor 136 and determine information about the user, the user's motion, the user's motion of the user device 120, or the user's environment based on the sensor signals.

In some embodiments, the haptic effect determination module 160 includes instructions that, when executed by the processor 102, cause the processor 102 to determine a haptic effect to generate. The haptic effect determination module 160 may include instructions that, when executed by the processor 102, cause the processor 102 to select one or more haptic effects to output using one or more algorithms or lookup tables. In some embodiments, the haptic effect determination module 160 comprises one or more algorithms or lookup tables that include data corresponding to various haptic effects and usable by the processor 102 to determine a haptic effect.

In some examples, the haptic effect determination module 160 may cause the processor 102 to determine a static haptic effect or a dynamic haptic effect. A static haptic effect can include one or more predetermined haptic effects based on the simulated reality environment or the user's interaction with the simulated reality environment. In some examples, a static haptic effect can have a predetermined characteristic (e.g., a predetermined magnitude, duration, location, type, pitch, frequency, etc.).

In some examples, a dynamic haptic effect can include one or more haptic effects that can change or vary based on sensor signals from the sensor 136. For example, a characteristic of a dynamic haptic effect (e.g., a magnitude, duration, location, type, pitch, frequency, etc.) can vary based on the simulated reality environment or sensor signals from the sensor 136 (e.g., based on the user's interaction with the simulated reality environment).

Particularly, in some embodiments, the haptic effect determination module 160 may include instructions that, when executed by the processor 102, cause the processor 102 to determine a static haptic effect based at least in part on a simulated reality environment (e.g., a simulated reality environment generated by the processor 102 executing instructions included in the content provision module 156) or a user's interaction with the simulated reality environment. For example, the processor 102 can determine or select a haptic effect based on a location of a touch in the simulated reality environment to simulate a presence of a virtual object (e.g., a virtual piece of furniture, automobile, animal, cartoon character, button, lever, logo, person, etc.) on the display 114. As another example, the user can interact with the simulated reality environment by tapping a virtual object in the simulated reality environment (e.g., to provide user input to select the virtual object). In this example, the haptic effect determination module 160 may cause the processor 102 to select one or more static haptic effects associated with the user tapping the virtual object. As still another example, the processor 102 can determine or select a static haptic effect based on static animation in the simulated reality environment (e.g., based on a virtual object that animates from one state to another in a predetermined manner). For instance, a static haptic effect may be selected based on a first predetermined action of a virtual character and another static haptic effect may be selected based on a second predetermined action of the virtual character. Further, in some embodiments, the haptic effect determination module 160 may include instructions that, when executed by the processor 102, cause the processor 102 to determine, based on the size, color, location, movement, and/or other characteristics of a virtual object, a static haptic effect to output and code that selects one or more static haptic effects to provide in order to simulate the effect. For example, static haptic effects may be selected based on the color of a virtual object (e.g., a strong vibration if the virtual object is red, and a weaker vibration if the virtual object is green).

In some examples, the haptic effect determination module 160 may include instructions that, when executed by the processor 102, cause the processor 102 to determine a dynamic haptic effect based at least in part on sensor signals (e.g., sensor signals received by the processor 102 from the sensor 136). For example, the sensor 136 may detect a user's motion (e.g., a user that is holding or wearing the user device 120) or a motion of the user device 120 as the user interacts with the simulated reality environment and transmit a sensor signal to the processor 102. The processor 102 may receive the sensor signal and determine the motion of the user or the user device 120 and/or a characteristic of the motion of the user or the user device 120. The haptic effect determination module 160 may cause the processor 102 to determine a dynamic haptic effect based at least in part on the determined user motion, motion of the user device 120 and/or characteristic of the motion. As another example, the sensor 136 can capture information about an amount of pressure of the user's contact with a virtual object in the simulated reality environment or a change in the amount of pressure of the user's contact. The sensor 136 transmits one or more signals indicating the amount of pressure or the change in pressure to the processor 102 in substantially real time as the sensor 136 captures information about the amount of pressure or change in the amount of pressure. In this example, the haptic effect determination module 160 may cause the processor 102 to select one or more dynamic haptic effects associated with the amount of pressure or the change in the amount of pressure. For instance, the processor 102 can select a dynamic haptic effect that is a strong vibration in response to determining that the amount of pressure of the user's contact is above a threshold. As another example, the processor 102 can gradually reduce a magnitude of one or more vibrations in response to determining that the amount of pressure of the user's contact is being reduced over a period of time.

In some examples, the haptic effect determination module 160 may cause the processor 102 to determine a user's motion (e.g., body gesture or motion of the user device 120) and/or a characteristic of the motion and determine or vary a characteristic (e.g., a magnitude, duration, location, type, pitch, frequency, etc.) of a dynamic haptic effect based on the motion and/or characteristic of the motion. For example, the haptic effect determination module 160 may cause the processor 102 to access one or more lookup tables or databases that include data corresponding to a characteristic of a dynamic haptic effect associated with a user's motion (e.g., body motion or motion of the user device 120) and/or characteristic of the motion. In this embodiment, the processor 102 can access the one or more lookup tables or databases and determine or vary a characteristic of one or more dynamic haptic effects associated with the motion and/or characteristic of the motion. For instance, if the user moves the user device 120 with a high velocity to interact with the simulated reality environment, the processor 102 can determine a dynamic haptic effect that includes a strong vibration or a series of strong vibrations. Continuing with this example, if the user subsequently moves the user device 120 with a low or lower velocity, the processor 102 can determine another characteristic of the haptic effect or vary a characteristic of the haptic effect such as, for example, by reducing a magnitude of the vibration or series of vibrations such that user perceives a weaker vibration as the user reduces the velocity of the user device 120.

In some examples, the haptic effect determination module 160 may cause the processor 102 to determine a periodic or aperiodic static or dynamic haptic effect (or haptic track e.g., a series of haptic effects). A periodic static or dynamic haptic effect can be generated based on a periodic waveform and an aperiodic static or dynamic haptic effect can be generated based on an aperiodic waveform. In some instances, a periodic static or dynamic haptic effect can be a haptic effect that can be output for a period of time and iterated after the period of time. For instance, the haptic effect determination module 160 may cause the processor 102 to select a periodic static haptic effect that includes a first static haptic effect that is output for a first period of time (e.g., sixty seconds). In this example, the periodic static haptic effect can include a second static haptic effect that is output after the first period of time. As another example, the haptic effect determination module 160 may cause the processor 102 to select a periodic dynamic haptic effect that includes a first dynamic haptic effect that is output for a first period of time (e.g., sixty seconds).

In still another example, the haptic effect determination module 160 may cause the processor 102 to select an aperiodic static haptic effect that includes a static haptic effect that is output for a period of time (e.g., sixty seconds). In this example, the aperiodic static haptic effect may not be iterated or repeated (e.g., may not include another static haptic effect). As still another example, the haptic effect determination module 160 may cause the processor 102 to select an aperiodic dynamic haptic effect that includes a dynamic haptic effect that is output for a period of time (e.g., sixty seconds). In this example, the aperiodic dynamic haptic effect may not include another dynamic haptic effect.

In some embodiments, the haptic effect determination module 160 may include instructions that, when executed by the processor 102, cause the processor 102 to determine a haptic effect based on an event. An event, as used herein, is any interaction, action, collision, or other event, which occurs during operation of the computing device 101 or user device 120, which can potentially comprise an associated haptic effect. In some embodiments, an event may comprise user input (e.g., a button press, manipulating a joystick, interacting with a simulated reality environment, tilting or orienting the user device 120), a system status (e.g., low battery, low memory, or a system notification, such as a notification generated based on the computing device 101 receiving a message, sending data, or receiving data), or a program event (e.g., if the program is a game or simulated reality environment, a program event may comprise explosions, gunshots, collisions, interactions between game or virtual characters, advancing to a new level, driving over bumpy terrain, etc.).

In some examples, the processor 102 can generate and output one or more interactive user interfaces via which the processor 102 can output data indicating one or more parameters of a determined or selected haptic effect or other information associated with the haptic effect.

Figure 2:
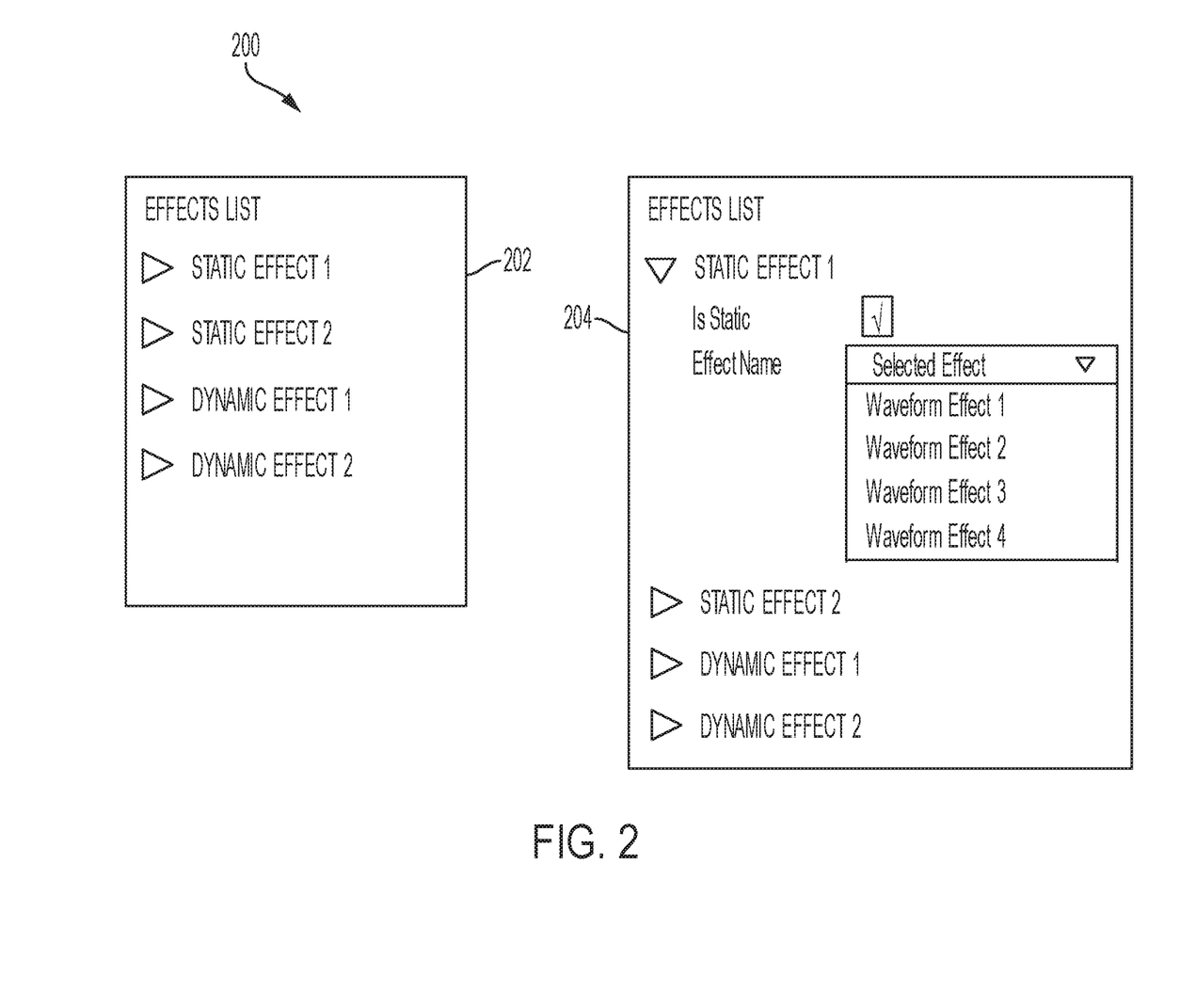
FIG. 2 is an example of an interactive user interface that can be generated for providing dynamic haptic playback or effects for an augmented or virtual reality environment in substantially real time according to one embodiment.

For example, FIG. 2 is an example of an interactive user interface 200 that can be generated (e.g., by the processor 102 of FIG. 1) for providing dynamic haptic playback or effects for an augmented or virtual reality environment in substantially real time according to one embodiment. In this example, a processor 102 of a computing device 101 of FIG. 1 can generate the interactive user interface 200 and display the interactive user interface 200 via a display (e.g., the display 114).

In the example depicted in FIG. 2, a portion 202 of the interactive user interface 200 includes a menu, list, table etc. that indicates various haptic effects (e.g., static or dynamic haptic effects determined or selected by the processor 102). In this example, the menu included in the portion 202 of the interactive user interface 200 can include one or more interactive control elements (e.g., a drop down button or any other interactive element) via which the processor 102 can receive data (e.g., via user input) indicating a selection of a particular haptic effect. In some examples, the processor 102 can receive data indicating a selection of a particular haptic effect (e.g., via user input indicating a selection of an interactive control element associated with the haptic effect) and the processor 102 can display additional information associated with the selected haptic effect.

For instance the processor 102 can generate and display another portion 204 of the interactive user interface 200 that includes additional information associated with a selected static haptic effect in response to user input indicating a selection of the static haptic effect. In this example, the portion 204 includes additional information associated with a static haptic effect such as data indicating that the haptic effect is a static haptic effect and one or more waveform associated with the static haptic effect (e.g., one or more waveforms that can be used to generate the static haptic effect).

Returning to FIG. 1, in some embodiments, the processor 102 can generate and output one or more interactive user interfaces via which the processor 102 can receive data (e.g., via user input), which can cause the processor 102 to modify a parameter of a determined or selected haptic effect. For instance, the processor 102 can generate an interactive user interface via which the user can provide user input indicating whether a particular haptic effect is a static or dynamic haptic effect. As another example, the processor 102 can generate an interactive user interface via which the user can provide user input indicating whether a particular haptic effect is a periodic or aperiodic static or dynamic haptic effect. In still another example, the processor 102 can generate an interactive user interface via which the user can provide user input indicating data about a waveform (e.g., data indicating whether the waveform is a periodic waveform, aperiodic waveform, linear waveform, sinusoidal waveform, square waveform, triangular waveform, sawtooth waveform, etc.) for generating a static or dynamic haptic effect. In some instances, if a haptic effect includes a periodic haptic effect (e.g., a period static or dynamic haptic effect), the processor 102 can generate an interactive user interface via which a user can provide user input indicating a duration of one or more haptic effects of the period haptic effect such as, for example, a start time and end time of one or more haptic effects of the periodic haptic effect. As still another example, the processor 102 can generate an interactive user interface via which the user can provide user input indicating a characteristic of a selected haptic effect (e.g., a magnitude, duration, location, type, frequency, pitch, etc.) of the haptic effect.

Figure 3:
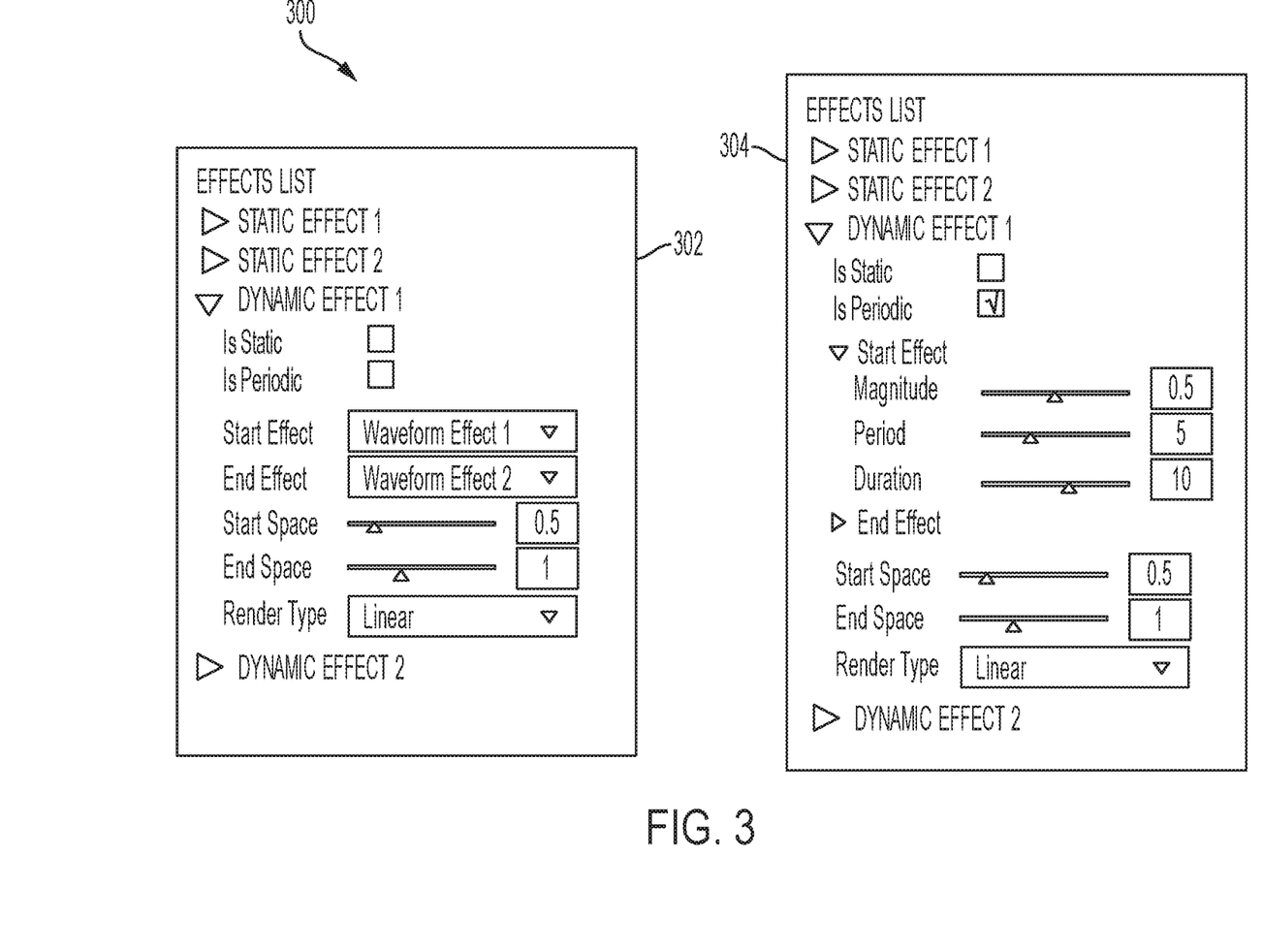
FIG. 3 is an example of an interactive user interface that can be generated for providing dynamic haptic playback or effects for an augmented or virtual reality environment in substantially real time according to another embodiment.

For example, FIG. 3 is an example of an interactive user interface 300 that can be generated (e.g., by the processor 102 of FIG. 1) for providing dynamic haptic playback or effects for an augmented or virtual reality environment in substantially real time according to one embodiment. In this example, a processor 102 of the computing device 101 of FIG. 1 can generate the interactive user interface 300 and display the interactive user interface 300 via a display (e.g., the display 114).

In the example depicted in FIG. 3, a portion 302 of the interactive user interface 300 includes a menu, list, table etc. that indicates various haptic effects (e.g., static or dynamic haptic effects determined or selected by the processor 102). In this example, the menu included in the portion 302 of the interactive user interface 300 can include one or more interactive control elements (e.g., a drop down button, a virtual button or slider, or any other interactive element) via which a user can select a particular haptic effect. In this example, once the user selects a haptic effect, the processor 102 can output or provide additional information associated with the haptic effect and the user can modify or indicate one or more parameters of the haptic effect via the interactive user interface 300. For instance, in the example depicted in FIG. 3, the user can provide user input to select a dynamic haptic effect and the processor 102 can display information associated with the dynamic haptic effect. In this example, the user can provide additional user input via one or more interactive control elements to indicate or modify parameters of the dynamic haptic effect including, for example, providing user input to indicate whether the dynamic haptic effect is a periodic dynamic haptic effect, a first (e.g., starting) dynamic haptic effect of the dynamic haptic effect, a second (e.g., ending) dynamic haptic effect of the dynamic haptic effect, a starting time or position of the dynamic haptic effect, an ending time or position of the dynamic haptic effect, and a type of a model (e.g., a linear model) for rendering or generating the dynamic haptic effect.

In this example, another portion 304 of the interactive user interface 300 includes another menu, list, table etc. that indicates the various haptic effects and includes various interactive control elements via which the user can modify or indicate one or more additional parameters of the haptic effects. For instance, in the portion 304 the user has provided user input indicating that the dynamic haptic effect is a periodic haptic effect. In this example, the user can provide user input to specify a magnitude, period, duration, start position or space, end position or space, or a model for rending or generating the periodic dynamic haptic effect.

While in the examples described above with respect to FIGS. 2 and 3, interactive control elements are depicted as a virtual slider, button, or other interactive element, the present disclosure is not limited to such configurations. Rather, in other examples, the interactive control element can be any element via which the user can provide user input to the interactive user interfaces 200 and 300.

Returning to FIG. 1, in some examples, the processor 102 can generate one or more user interfaces (e.g., the interactive user interfaces 200 of FIG. 2 or the interactive user interface 300 of FIG. 3) in substantially real time (e.g., as the processor 102 selects or determines a haptic effect). In this example, the processor 102 can receive user input indicating one or more parameters of the haptic effect as described above and transmit data indicating the parameters to the processor 140 of the xPC target machine 142, which can generate and transmit a haptic signal based on the parameters of the haptic effect in substantially real time as described in further detail below.

In this manner, systems and methods described herein provide systems and methods for configuring and providing dynamic haptic playback or effects for an augmented or virtual reality environment in substantially real time by allowing a user to configure various parameters of a haptic effect in substantially real time (e.g., as the haptic effect is output to the user or another user).

In some embodiments, the xPC control module 162 represents programming that causes the processor 102 to transmit data about one or more parameters of a determined haptic effect to a processor 140 of an xPC target machine 142 (e.g., via the network device 108 and network device 148). In some embodiments, the xPC control module 162 represents programming that causes the processor 102 to transmit data from the sensor 136 to the processor 140 of the xPC target machine 142.

In some examples, the xPC target machine 142 can be communicatively coupled to the processor 102 of the computing device 101 or the processor 122 of the user device 120 to obtain data from the computing device 101 or the user device 120 in substantially real time. In some instances, the xPC target machine 142 can be a computing device, server, device, etc. that can be capable of achieving sampling rates up to at least 20 kHz or sampling rates of at least 100 khz, which can allow the xPC target machine 142 to process data from the computing device 101 or the user device 120 in substantially real time and generate, in substantially real time, one or more haptic signals having a frequency of up to approximately 20 kHz. In some examples, the xPC target machine can be device or machine that is separate or remote from the computing device 101.

Turning to memory 146 of the xPC target machine 142, modules 164 and 166 are depicted to show how a device can be configured in some embodiments to provide dynamic haptic playback or effects for an augmented or virtual reality environment in substantially real time. In some embodiments, modules 164 and 166 may comprise processor executable instructions that can configure the processor 140 to perform one or more operations.

For example, an xPC module 164 can include instructions that, when executed by the processor 140 of the xPC target machine 142, cause the processor 140 to receive or obtain data from the computing device 101 or the user device 120. In some examples, the xPC module 164 can include instructions that, when executed by the processor 140, cause the processor 140 to receive a signal indicating data about one or more parameters of a selected or determined haptic effect or sensor data (e.g., data from the sensor 136) from the processor 102 of the computing device 101. In another example, the xPC module 164 can include instructions that, when executed by the processor 140, cause the processor 140 to receive sensor data from the sensor 136 of the user device 120.

In some examples, the xPC module 164 can include instructions that, when executed by the processor 140, cause the processor 140 to determine one or more parameters of a haptic effect determined by the processor 102 executing instructions included in the haptic effect determination module 160 and generate a haptic signal based on the haptic effect. For example, the xPC module 164 may include instructions that, when executed by the processor 140, cause the processor 140 to determine whether a selected or determined haptic effect is a static haptic effect, a dynamic haptic effect, a periodic static or dynamic haptic effect, an aperiodic static or dynamic haptic effect, etc. based on data about one or more parameters of the haptic effect received from the processor 102 of the computing device 101.

In some examples, the xPC module 164 can include instructions that, when executed by the processor 140, cause the processor to execute instructions on the haptic effect generation module 166.

In some embodiments, the haptic effect generation module 166 represents programming that causes the processor 140 to generate and transmit haptic signals to a haptic output device (e.g., the haptic output device 138 of the user device 120 or another haptic output device) to generate a selected haptic effect. In some embodiments, the processor 140 can transmit haptic signals to the haptic output device to cause the haptic output device to generate a haptic effect determined by the processor 102 executing instructions included in the haptic effect determination module 160. In some examples, the haptic effect generation module 166 can include instructions that, when executed by the processor 140, cause the processor 140 to access stored waveforms or commands to send to the haptic output device to create the selected haptic effect. For example, the haptic effect generation module 166 may cause the processor 140 to access a lookup table that includes data indicating one or more haptic signals associated with one or more haptic effects and determine a waveform (e.g., a periodic or aperiodic waveform) to transmit to the haptic output device to generate a particular haptic effect. In some embodiments, the haptic effect generation module 166 may comprise algorithms to determine the haptic signal. In some embodiments, the haptic effect generation module 166 may include instructions that, when executed by the processor 140, cause the processor 140 to determine target coordinates for the haptic effect (e.g., coordinates for a location at which to output the haptic effect). For example, the haptic effect generation module 166 may include instructions that, when executed by the processor 140, cause the processor 140 to use a sensor signal indicating a motion of a particular body part of the user to determine target coordinates for the haptic effect (e.g., the particular body part of the user). In some embodiments, the processor 140 can transmit a haptic signal to a haptic output device that includes one or more haptic output devices. In such embodiments, the haptic effect generation module 166 may cause the processor 140 to transmit haptic signals to the one or more haptic output devices to generate the selected haptic effect.

In some examples, the haptic effect generation module 166 may include instructions that, when executed by the processor 140, cause the processor 140 to generate one or more haptic signals having a frequency in a range between approximately 1 Hz and 20 kHz in substantially real time (e.g., as the processor 140 receives data from the processor 102 or the processor 122). As example, the processor 140 can generate one or more haptic signals having a frequency of approximately 1 kHz.

In this manner, the xPC target machine 142 can obtain data from the processor 102 or the processor 122 in substantially real time and generate one or more haptic signals for providing high definition dynamic or static haptic effects for a simulated reality environment in substantially real time.

While in some examples described above, the processor 140 of the xPC target machine 142 receives (e.g., obtains) data from the sensor 136 via the processor 102 (e.g., via the processor 102 upon executing instructions included in the xPC control module 162) the present disclosure is not limited to such configurations. Rather, in other examples, the xPC target machine 142 is communicatively coupled to the sensor 136 and receives data from the sensor 136. In another embodiment, the user device 120 and the xPC target machine 142 are part of a single system and the xPC target machine 142 can be communicatively coupled to the sensor 136 to receive sensor data from the sensor 136. In some such examples, the xPC target machine 142 can determine one or more parameters of a dynamic haptic effect based on sensor signals in substantially the same manner as described above.

Although the exemplary system 100 of FIG. 1 is depicted as having a certain number of components, in other embodiments, the exemplary system 100 has any number of additional or alternative components. Further, while FIG. 1 illustrates a particular arrangement of the computing device 101, the user device 120, and the xPC target machine 142, various additional arrangements are possible. As an example, while FIG. 1 illustrates the user device 120 and the xPC target machine 142 as being separate, in some embodiments, the user device 120 and the xPC target machine are part of a single system. For instance, the user device 120 may include the xPC target machine 142 or the xPC module 164 and the processor 122 of the user device 120 can execute instructions included in the memory 146 of the xPC target machine 142 (e.g., execute instructions in the xPC module 164 or the haptic effect generation module 166). As another example, the computing device 101 may include the xPC target machine 142 and the processor 102 of the computing device 101 can execute instructions included in the memory 146 of the xPC target machine 142 (e.g., execute instructions in the xPC module 164 or the haptic effect generation module 166). In another example, the components of the system 100 can be remote and separate from each other. For example, the user device and the xPC target machine 142 can be remote and separate from the computing device 101.

Moreover, while in some examples described above, the xPC target machine 142 (or the processor 140 of the xPC target machine 142) can achieve sampling rates up to at least 20 kHz or sampling rates of at least 100 khz or higher, the present disclosure is not limited to such configurations. Rather, in other examples, the processor 122 of the user device 120 can be configured to achieve sampling rates up to at least 20 kHz or sampling rates of at least 100 khz or higher. As an example, the user device 120 and the xPC target machine 142 can be separate systems as depicted in FIG. 1 and the processor 122 of the user device 120 can be configured to achieve sampling rates up to at least 20 kHz or sampling rates of at least 100 khz or higher. Furthermore, as described above, in some examples, the user device 120 and the xPC target machine 142 can be part of a single system. In this example, the processor 122 can execute instructions included in the memory 146 (e.g., the xPC module 164 and/or the haptic effect generation module 166). In this example, the processor 122 can be configured to achieve sampling rates up to at least 20 kHz or sampling rates of at least 100 khz or higher.

Furthermore, while FIG. 1 illustrates the computing device 101 and the xPC target machine 142 as being separate, as described above, in some embodiments, the computing device 101 and the xPC target machine are part of a single system. In this example, the computing device 101 can include the processor 102 and the processor 140. The processor 102 can be configured to execute instructions included in the memory 104 (e.g., the modules 156, 158, 160, 162) and the processor 140 can be configured to execute instructions included in the memory 146 (e.g., the xPC module 164 and/or the haptic effect generation module 166). In this example, the processor 140 can be configured to achieve sampling rates up to at least 20 kHz or sampling rates of at least 100 khz or higher and generate one or more haptic signals having a frequency in a range between approximately 1 Hz and 20 kHz in substantially real time, in substantially the same manner as described above. Continuing with this example, the processor 102 can be configured to achieve lower sampling rates as compared to the processor 140.

In another embodiment, the computing device 101 and the xPC target machine are part of a single system. In this example, the processor 102 and the processor 140 can be combined into a single processor. In this example, the processor can be configured to execute instructions included in the memory 104 (e.g., the modules 156, 158, 160, 162) and the memory 142 (e.g., the xPC module 164 and/or the haptic effect generation module 166). In this example, the single processor can be configured to achieve sampling rates up to at least 20 kHz or sampling rates of at least 100 khz or higher.

Moreover, in some examples, a haptic effect can be generated (e.g., by a processor executing instructions included in the haptic effect generation module 160) at a low sampling rate and a haptic output device (e.g., the haptic output device 138) outputting the haptic effect can output the haptic effect at a high rate. As an example, a processor can generate a haptic effect (e.g., by executing instructions included in the haptic effect generation module 160) at a sampling rate of approximately 1000 Hz. In this example, a haptic output device can output the haptic effect at a higher rate such as, for example, 30000 Hz.

Figure 4:
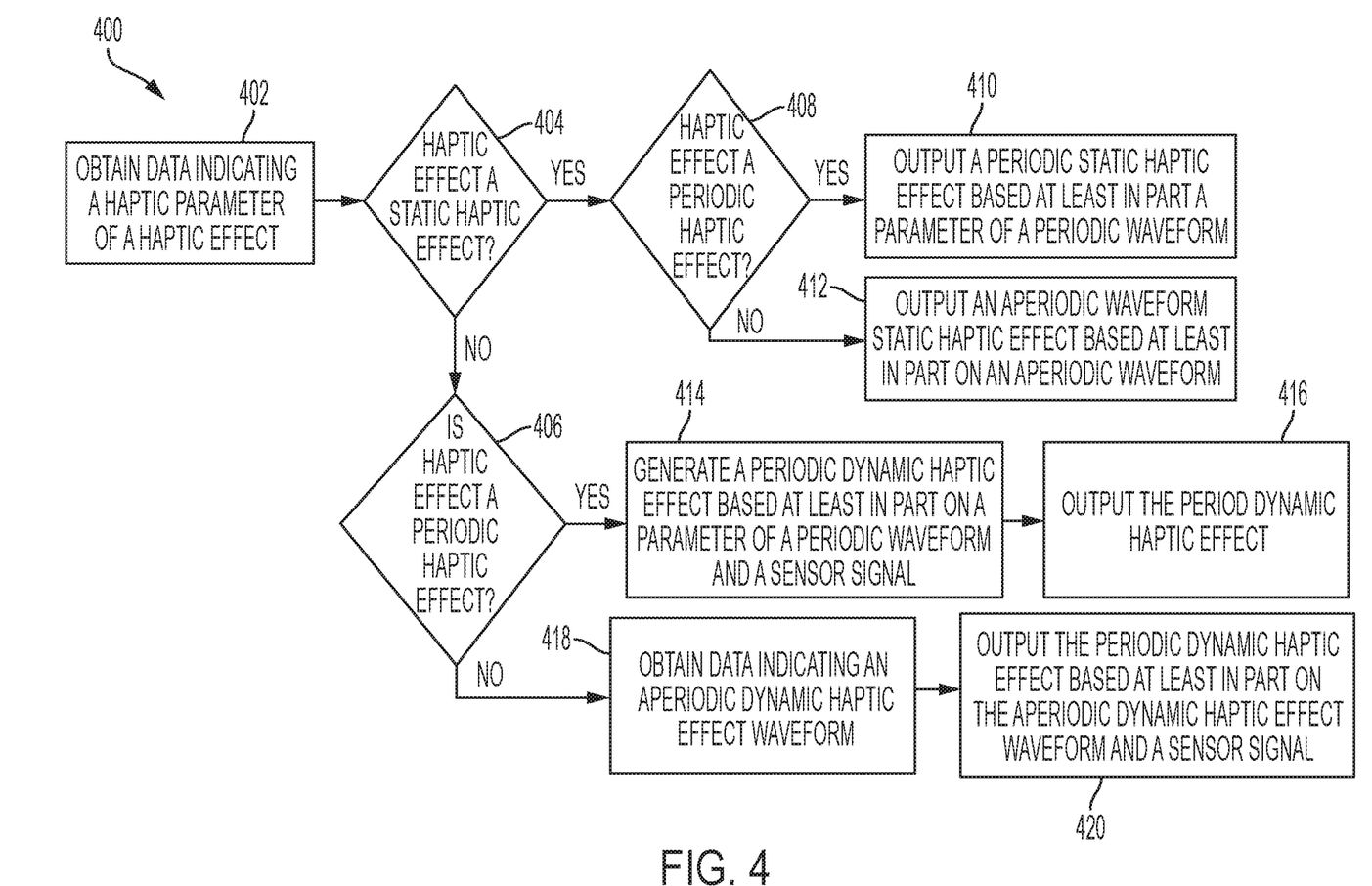
FIG. 4 is a flow chart of steps for performing a method for providing dynamic haptic playback or effects for an augmented or virtual reality environment in substantially real time according to one embodiment.

Illustrative Methods for Providing Dynamic Haptic
Playback or Effects for an Augmented or Virtual
Reality Environment in Substantially Real Time FIG. 4 is a flow chart of steps for performing a method 400 for providing dynamic haptic playback or effects for an augmented or virtual reality environment in substantially real time according to one embodiment. In some embodiments, the steps in FIG. 4 may be implemented in program code that is executable by a processor, for example, the processor in a general purpose computer, a mobile device, or a server. In some embodiments, these steps may be implemented by a group of processors. In some embodiments, one or more steps shown in FIG. 4 may be omitted or performed in a different order. Similarly, in some embodiments, additional steps not shown in FIG. 4 may also be performed. For illustrative purposes, the steps of the method 400 are described below with reference to components described above with regard to the system shown in FIG. 1, but other implementations are possible.

The method 400 begins at step 402 when data indicating one or more parameters of a haptic effect is obtained (e.g., received). For example, an xPC target machine 142 can obtain data indicating one or more parameters of a haptic effect from a computing device 101.

In some embodiments, a haptic effect determination module 160 of the computing device 101 causes a processor 102 of the computing device 101 to determine a haptic effect or one or more parameters of the haptic effect. In some embodiments, the haptic effect can include one or more haptic effects.

For example, the processor 102 can determine a haptic effect (e.g., one or more vibrations) based at least in part on a simulated reality environment (e.g., a simulated reality environment generated by the processor 102 executing instructions included in a content provision module 156) or a user's interaction with the simulated reality environment. As an example, the processor 102 can determine or select a haptic effect based on a location of a touch in the simulated reality environment to simulate a presence of a virtual object (e.g., a virtual piece of furniture, automobile, animal, cartoon character, button, lever, logo, or person) on the display 114. As another example, the processor 102 can determine or select a haptic effect based on static animation in the simulated reality environment (e.g., based on a virtual object that animates from one state to another in a predetermined manner). For instance, a haptic effect may be selected based on a first predetermined action of a virtual object and another haptic effect may be selected based on a second predetermined action of the virtual object. As another example, the processor 102 can determine a haptic effect based on an event. An event, as used herein, is any interaction, action, collision, or other event, which occurs during operation of the computing device 101 or user device 120, which can potentially comprise an associated haptic effect such as, for example, user input (e.g., a button press, manipulating a joystick, interacting with a simulated reality environment, tilting or orienting the user device 120), explosions, gunshots, collisions, interactions between game or virtual characters in a simulated reality environment, etc.).

In some examples, a haptic effect determined by the processor 102 based on a simulated reality environment or a user's interaction with the simulated reality environment can be a static haptic effect. A static haptic effect can be a predetermined haptic effect such as, for example, a haptic effect having a predetermined characteristic (e.g., a predetermined magnitude, duration, location, type, pitch, frequency, etc.). For example, the user can interact with the simulated reality environment by tapping a virtual object in the simulated reality environment (e.g., to provide user input to select the virtual object). In this example, the haptic effect determination module 160 may cause the processor 102 to select one or more static haptic effects associated with the user tapping the virtual object.

In some embodiments, the processor 102 can determine a haptic effect based at least in part on a signal received from the sensor 136. In some examples, a haptic effect determined by the processor 102 based on a signal received from the sensor 136 can be a dynamic haptic effect. A dynamic haptic effect can be haptic effect that can change based on sensor signals from the sensor 136. For example, a characteristic of a dynamic haptic effect (e.g., a magnitude, duration, location, type, pitch, frequency, etc.) can vary based on the simulated reality environment or sensor signals from the sensor 136 (e.g., based on the user's interaction with the simulated reality environment).

For example, the sensor 136 can be a wearable sensor, any sensor that can be coupled (e.g., attached) to a user or the user device 120, or any sensor otherwise associated with the user device 120 to capture information about the user's motions (e.g., a motion or gesture of the user's body part) or the motion of the user device 120. In some examples, the sensor 136 can capture information about the user's motion or the motion of the user device 120 including, but not limited to, a path, velocity, acceleration, or force of the motion, and/or any other characteristic of the motion. In some examples, the sensor 136 can transmit a signal indicating the information about the motion of the user or the motion of the user device 120 to the processor 102. In some embodiments, the sensor 136 can transmit one or more signals to the processor 102 in substantially real time (e.g., as the sensor 136 captures information about a motion of the user or motion of the user device 120). In this example, the processor 102 can receive the sensor signal and determine a dynamic haptic effect based at least in part on the sensor signal.

As an example, the sensor 136 can capture information about velocity of the user device 120 or a change in the velocity of the user device 120 as the user interacts with the simulated reality environment. The sensor 136 transmits one or more signals indicating the velocity or the change in velocity to the processor 102 in substantially real time as the sensor 136 captures information about the velocity or change in the amount of velocity. In this example, the haptic effect determination module 160 may cause the processor 102 to select one or more dynamic haptic effects associated with the velocity or the change in the amount of velocity. For instance, the processor 102 can select a dynamic haptic effect that is a strong vibration in response to determining that the velocity of the user device 120 is above a threshold. As another example, the processor 102 can gradually reduce a magnitude of one or more vibrations in response to determining that the velocity of the user device 120 is reducing over a period of time.

In some examples, the haptic effect determination module 160 may cause the processor 102 to determine a periodic or aperiodic static or dynamic haptic effect or haptic track. A periodic static or dynamic haptic effect can be generated based on a periodic waveform and an aperiodic static or dynamic haptic effect can be generated based on an aperiodic waveform.

In some examples, an xPC module 164 of the xPC target machine 142 can include instructions that, when executed by a processor 140 of the xPC target machine 142, cause the processor 140 to receive data indicating one or more parameters of a haptic effect selected or determined by the processor 102 of a computing device 101 executing instructions included in the haptic effect determination module 160.

The method continues at step 404 when the processor 140 of the xPC target machine 142 determines whether the haptic effect is a static haptic effect. For example, the processor 140 obtains data from the processor 102 indicating one or more parameters of a haptic effect selected or determined by the processor 102 (e.g., one or more parameters obtained in step 402).

In some examples, the xPC module 164 of the xPC target machine 142 can include instructions that, when executed by the processor 140, cause the processor 140 to determine whether a haptic effect selected by the processor 102 is a static haptic effect or a dynamic haptic effect. For example, the processor 140 can analyze the data obtained from the processor 102 (e.g., in step 402) and determine whether the haptic effect is a static haptic effect or a dynamic haptic effect and/or one or more characteristics of the haptic or static effect based on the data.

If the processor 140 of the xPC target machine 142 determines at step 404 that the haptic effect is not a static haptic effect, then method 400 proceeds to step 406, which is described in further detail below.

If the processor 140 determines at step 404 that the haptic effect is a static haptic effect, then then method 400 proceeds to step 408 and the processor 140 determines whether the static haptic effect is a periodic haptic effect. In some examples, the xPC module 164 of the xPC target machine 142 can include instructions that, when executed by the processor 140, cause the processor 140 to determine whether a haptic effect selected by the processor 102 is a periodic haptic effect (e.g., a haptic effect that can be generated based on a periodic waveform) or an aperiodic haptic effect (e.g., a haptic effect that can be generated based on a periodic waveform). For example, the processor 140 can analyze the data obtained from the processor 102 (e.g., in step 402) and determine whether the static haptic effect is a periodic static haptic effect or an aperiodic static haptic effect and/or one or more characteristics of the periodic or aperiodic static haptic effect (e.g., a magnitude, period, duration, start time, end time, etc. of one or more haptic effects of a periodic static haptic effect).

If the processor 140 determines at step 408 that the static haptic effect is a periodic static haptic effect, then then method 400 proceeds to step 410 and a periodic static haptic effect is output based at least in part on a parameter of a periodic waveform. In some examples, the xPC target machine 142 can generate and transmit a haptic signal to cause a haptic output device 138 to output the periodic static haptic effect.

For example, the xPC module 164 can include instructions that, when executed by the processor 140, cause the processor to execute instructions on the haptic effect generation module 166.

In some embodiments, the haptic effect generation module 166 represents programming that causes the processor 140 to generate and transmit haptic signals to a haptic output device 138. In some examples, the processor 140 generates and transmit a haptic signal to the haptic output device 138 to cause the haptic output device 138 to generate a haptic effect determined by the processor 102 executing instructions included in the haptic effect determination module 160.

In some examples, the haptic effect generation module 166 can include instructions that, when executed by the processor 140, cause the processor 140 to access stored waveforms or commands to send to the haptic output device 138 to create the selected periodic static haptic effect. For example, the haptic effect generation module 166 may cause the processor 140 to access a lookup table that includes data indicating one or more haptic signals associated with one or more haptic effects and determine a periodic static haptic effect waveform or parameters of the periodic static haptic effect waveform (e.g., a magnitude, period, duration, start time, end time, etc. of the periodic static haptic effect waveform) to transmit to the haptic output device 138 to generate the selected periodic static haptic effect.

For example, in step 410, the processor 140 transmits a haptic signal to the haptic output device 138 to cause the haptic output device 138 to output a periodic static haptic effect based on the haptic signal. For instance, the haptic output device 138 can output one or more periodic static haptic effects to a user associated with the user device 120 (e.g., a user holding, wearing, using, or otherwise associated with the user device 120). In some embodiments, the haptic output device 138 can receive the haptic signal in substantially real time (e.g., as the xPC target machine 142 obtains data about one or more parameters of a haptic effect from the processor 102) such that the haptic output device 138 can output the periodic static haptic effect in substantially real time.

Returning to step 408, if the processor 140 determines that the static haptic effect is not a periodic static haptic effect, then then method 400 proceeds to step 412 and an aperiodic waveform static haptic effect is output based at least in part on an aperiodic waveform.

In some examples, the haptic effect generation module 166 can include instructions that, when executed by the processor 140, cause the processor 140 to access stored waveforms or commands to send to the haptic output device 138 to create the selected aperiodic static haptic effect. For example, the haptic effect generation module 166 may cause the processor 140 to access a lookup table that includes data indicating one or more haptic signals associated with one or more haptic effects and determine an aperiodic static haptic effect waveform or parameters of the aperiodic static haptic effect waveform to transmit to the haptic output device 138 to generate the selected aperiodic static haptic effect.

For example, the haptic effect generation module 166 can include instructions that, when executed by the processor 140, cause the processor 140 to transmit a haptic signal to the haptic output device 138 to cause the haptic output device 138 to output an aperiodic waveform static haptic effect based on the haptic signal. For instance, the haptic output device 138 can output the aperiodic waveform static haptic effect to a user associated with the user device 120 (e.g., a user holding, wearing, using, or otherwise associated with the user device 120). In some embodiments, the haptic output device 138 can receive the haptic signal in substantially real time (e.g., as the xPC target machine 142 obtains data about one or more parameters of a haptic effect from the processor 102) such that the haptic output device 138 can output the aperiodic waveform static haptic effect in substantially real time.

Returning to step 404, if the processor 140 of the xPC target machine 142 determines at step 404 that the haptic effect is not a static haptic effect (e.g., that the haptic effect is a dynamic haptic effect), then method 400 proceeds to step 406.

In step 406, the processor 140 determines whether the dynamic haptic effect is a periodic haptic effect. In some examples, the xPC module 164 of the xPC target machine 142 can include instructions that, when executed by the processor 140, cause the processor 140 to determine whether a haptic effect selected by the processor 102 is a periodic haptic effect or an aperiodic haptic effect. For example, the processor 140 can analyze the data obtained from the processor 102 (e.g., in step 402) and determine whether the dynamic haptic effect is a periodic static haptic effect or an aperiodic static haptic effect and/or one or more characteristics of the periodic or aperiodic dynamic haptic effect (e.g., a start time or end time of one or more haptic effects of a periodic dynamic haptic effect).

If the processor 140 determines at step 406 that the dynamic haptic effect is a periodic dynamic haptic effect, then then method 400 proceeds to step 414 and a periodic dynamic haptic effect is generated based at least in part on a parameter of a periodic waveform and a sensor signal (e.g., a sensor signal from the sensor 136).

For example, the haptic effect generation module 166 can include instructions that, when executed by the processor 140, cause the processor 140 to access stored waveforms or commands to send to the haptic output device 138 to create the selected periodic dynamic haptic effect. For example, the haptic effect generation module 166 may cause the processor 140 to access a lookup table that includes data indicating one or more haptic signals associated with one or more haptic effects and determine a periodic dynamic haptic effect waveform or parameters of the periodic dynamic haptic effect waveform (e.g., a magnitude, period, duration, start time, end time, etc. of the periodic dynamic haptic effect waveform) to transmit to the haptic output device 138 to generate the selected periodic dynamic haptic effect.

In some examples, as described above, a dynamic haptic effect can vary based on sensor data from the sensor 136. In this example, the processor 102 can receive sensor signals from the sensor 136 and determine a user's motion (e.g., body gesture or motion of the user device 120) and/or a characteristic of the motion and determine or vary a characteristic (e.g., a magnitude, duration, location, type, pitch, frequency, etc.) of a dynamic haptic effect based on the motion and/or characteristic of the motion. For example, the processor 102 can access one or more lookup tables or databases that include data corresponding to a characteristic of a dynamic haptic effect associated with a user's motion (e.g., body motion or motion of the user device 120) and/or characteristic of the motion. In this embodiment, the processor 102 can access the one or more lookup tables or databases and determine or vary a characteristic of one or more dynamic haptic effects associated with the motion and/or characteristic of the motion. For instance, if the user is contacting a virtual object in the simulated reality environment with a high amount of pressure, the processor 102 can determine a dynamic haptic effect that includes a strong vibration or a series of strong vibrations. Continuing with this example, if the user subsequently reduces the amount of pressure of the user's contact with the virtual object, the processor 102 can determine another characteristic of the haptic effect or vary a characteristic of the haptic effect such as, for example, by reducing a magnitude of the vibration or series of vibrations such that user perceives a weaker vibration as the user reduces the amount of pressure of the user's contact with the virtual object.

In some embodiments, the processor 102 can receive signals from the sensor 136 in substantially real time (e.g., as the sensor 136 captures information about the user's motion or motion of the user device 120) and transmit data indicating one or more parameters of a haptic effect to the xPC target machine (e.g., in step 402) in substantially real time. In this example, in step 414, the processor 140 of the xPC target machine 142 can receive the data from the processor 102 and/or sensor data from the sensor 136 and generate a dynamic haptic signal based on the data obtained or received from the processor 102 and/or the sensor 136 in substantially the same manner as described above.

In step 416, the periodic dynamic haptic effect is output. For example, the haptic effect generation module 166 can include instructions that, when executed by the processor 140, cause the processor 140 to transmit a haptic signal to the haptic output device 138 to cause the haptic output device 138 to output the periodic dynamic haptic effect based on the haptic signal. For instance, the haptic output device 138 can output the periodic dynamic haptic effect to a user associated with the user device 120 (e.g., a user holding, wearing, using, or otherwise associated with the user device 120). In some embodiments, the haptic output device 138 can receive the haptic signal in substantially real time (e.g., as the xPC target machine 142 obtains data about one or more parameters of a haptic effect from the processor 102) such that the haptic output device 138 can output the periodic dynamic haptic effect in substantially real time.

Returning to step 406, if the processor 140 determines that the dynamic haptic effect is not a periodic dynamic haptic effect, then the method 400 proceeds to step 418 and data indicating an aperiodic dynamic haptic effect waveform is obtained. For example, the haptic effect generation module 166 can include instructions that, when executed by the processor 140, cause the processor 140 to access stored waveforms or commands to send to the haptic output device 138 to create the selected aperiodic dynamic haptic effect. For example, the haptic effect generation module 166 may cause the processor 140 to access a lookup table that includes data indicating one or more haptic signals associated with one or more haptic effects and determine an aperiodic dynamic haptic effect waveform or parameters of the aperiodic dynamic haptic effect waveform to transmit to the haptic output device 138 to generate the selected aperiodic dynamic haptic effect.

In some examples, as described above, a dynamic haptic effect can vary based on sensor data from the sensor 136. In this example, the processor 102 can receive signals from the sensor 136 in substantially real time (e.g., as the sensor 136 captures information about the user's motion or motion of the user device 120) and transmit data indicating one or more parameters of a haptic effect to the xPC target machine (e.g., in step 402) in substantially real time. In this example, in step 418, the processor 140 of the xPC target machine 142 can receive the data from the processor 102 and/or sensor data from the sensor 136 and generate a dynamic haptic signal based on the data obtained or received from the processor 102 and/or the sensor 136 in substantially the same manner as described above.

In step 420, the aperiodic dynamic haptic effect is output based at least in part on the sensor signal and the aperiodic dynamic haptic effect waveform (e.g., the aperiodic dynamic haptic effect waveform obtained in step 418)

For example, the haptic effect generation module 166 can include instructions that, when executed by the processor 140, cause the processor 140 to transmit a haptic signal to the haptic output device 138 to cause the haptic output device 138 to output the aperiodic dynamic haptic effect based on the haptic signal. For instance, the haptic output device 138 can output the aperiodic dynamic haptic effect to a user associated with the user device 120 (e.g., a user holding, wearing, using, or otherwise associated with the user device 120). In some embodiments, the haptic output device 138 can receive the haptic signal in substantially real time (e.g., as the xPC target machine 142 obtains data about one or more parameters of a haptic effect from the processor 102) such that the haptic output device 138 can output the aperiodic dynamic haptic effect in substantially real time.

In some instances, the xPC target machine 142 can be a computing device, server, device, etc. that can be capable of achieving sampling rates up to at least 20 kHz or sampling rates of at least 100 khz or higher, which can allow the xPC target machine 142 to process data from the computing device 101 (e.g., from the processor 102) or the user device 120 (e.g., the sensor 136) in substantially real time and generate, in substantially real time, one or more haptic signals having a frequency in a range between approximately 1 kHz and 20 kHz. As example, the xPC target machine 142 can generate one or more haptic signals having a frequency of approximately 1 kHz.

While in some examples described above, the processor 140 of the xPC target machine 142 receives (e.g., obtains) data from the sensor 136 via the processor 102 (e.g., via the processor 102 upon executing instructions included in the xPC control module 162) the present disclosure is not limited to such configurations. Rather, in other examples, the user device 120 and the xPC target machine 142 are part of a single system and the xPC target machine can be communicatively coupled to the sensor 136 to receive sensor data from the sensor 136.

In this manner, the systems and methods described herein can generate and provide high definition dynamic or static haptic playback (e.g., effects) for an augmented or virtual reality environment in substantially real time.

General Considerations

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process that is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered. Accordingly, the above description does not bound the scope of the claims.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

Embodiments in accordance with aspects of the present subject matter can be implemented in digital electronic circuitry, in computer hardware, firmware, software, or in combinations of the preceding. In one embodiment, a computer may comprise a processor or processors. The processor comprises or has access to a computer-readable medium, such as a random access memory (RAM) coupled to the processor. The processor executes computer-executable program instructions stored in memory, such as executing one or more computer programs including a sensor sampling routine, selection routines, and other routines to perform the methods described above.

Such processors may comprise a microprocessor, a digital signal processor (DSP), an application-specific integrated circuit (ASIC), field programmable gate arrays (FPGAs), and state machines. Such processors may further comprise programmable electronic devices such as PLCs, programmable interrupt controllers (PICs), programmable logic devices (PLDs), programmable read-only memories (PROMs), electronically programmable read-only memories (EPROMs or EEPROMs), or other similar devices.

Such processors may comprise, or may be in communication with, media, for example tangible computer-readable media, that may store instructions that, when executed by the processor, can cause the processor to perform the steps described herein as carried out, or assisted, by a processor. Embodiments of computer-readable media may comprise, but are not limited to, all electronic, optical, magnetic, or other storage devices capable of providing a processor, such as the processor in a web server, with computer-readable instructions. Other examples of media comprise, but are not limited to, a floppy disk, CD-ROM, magnetic disk, memory chip, ROM, RAM, ASIC, configured processor, all optical media, all magnetic tape or other magnetic media, or any other medium from which a computer processor can read. Also, various other devices may comprise computer-readable media, such as a router, private or public network, or other transmission device. The processor, and the processing, described may be in one or more structures, and may be dispersed through one or more structures. The processor may comprise code for carrying out one or more of the methods (or parts of methods) described herein.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such modifications, variations and/or additions to the present subject matter as would be readily apparent to one of ordinary skill in the art.

What is claimed is:

1. A computing device comprising:
a processor and a non-transitory computer-readable medium communicatively coupled to the processor, wherein the processor is configured to execute processor-executable instructions stored in the non-transitory computer-readable medium to:
generate a simulated reality environment;
obtain sensor data indicating an interaction associated with the simulated reality environment, the sensor data obtained at a sampling rate;
determine, based on the interaction, whether to output a static haptic effect or a dynamic haptic effect;
responsive to a determination to output a dynamic haptic effect, iteratively during the interaction substantially in real time and substantially at the sampling rate:
determine, using the obtained sensor data, one or more parameters of the dynamic haptic effect;
generate one or more haptic signals associated with the dynamic haptic effect based on the one or more parameters; and
transmit the one or more haptic signals associated with the dynamic haptic effect to a haptic output device to output the dynamic haptic effect in substantially real time.

2. The computing device of claim 1, wherein the processor is further configured to execute processor-executable instructions stored in the non-transitory computer-readable medium to:
receive, from a sensor configured to capture information about a user, a sensor signal indicating information about the user; and
determine whether to output the dynamic haptic effect based at least in part on the sensor signal, wherein the one or more haptic signals associated with the dynamic haptic effect are based on the dynamic haptic effect.

3. The computing device of claim 2, wherein the processor is further configured to execute processor-executable instructions stored in the non-transitory computer-readable medium to: determine, based on the one or more parameters of the dynamic haptic effect, that the dynamic haptic effect is a periodic dynamic haptic effect, wherein the periodic dynamic haptic effect is based on a periodic waveform, and the one or more haptic signals associated with the dynamic haptic effect are based on the periodic waveform.

4. The computing device of claim 2, wherein the processor is further configured to execute processor-executable instructions stored in the non-transitory computer-readable medium to: determine, based on the one or more parameters of the dynamic haptic effect, that the dynamic haptic effect is an aperiodic dynamic haptic effect, wherein the aperiodic dynamic haptic effect is based on an aperiodic waveform, and the one or more haptic signals associated with the dynamic haptic effect are based on the aperiodic waveform.

5. The computing device of claim 2, wherein the information about a user comprises biological or biometric information about the user.

6. The computing device of claim 1, wherein the processor is further configured to execute processor-executable instructions stored in the non-transitory computer-readable medium to: determine, based on the interaction, to output a static haptic effect, wherein the static haptic effect is a predetermined haptic effect, and one or more haptic signals are associated with the static haptic effect.

7. The computing device of claim 6, wherein the processor is further configured to execute processor-executable instructions stored in the non-transitory computer-readable medium to: determine one or more parameters of the static haptic effect, wherein the static haptic effect is a periodic static haptic effect, the static haptic effect is a periodic static haptic effect, the periodic static haptic effect is based on a periodic waveform, and the one or more haptic signals associated with the static haptic effect are based on the periodic waveform.

8. The computing device of claim 6, wherein the processor is further configured to execute processor executable instructions stored in the non-transitory computer-readable medium to: determine one or more parameters of the static haptic effect, wherein the static haptic effect is an aperiodic static haptic effect, the aperiodic static haptic effect is based on an aperiodic waveform, and the one or more haptic signals associated with the static haptic effect are based on the aperiodic waveform.

9. A method comprising:
generating, by a processor, a simulated reality environment;
obtaining, by the processor, sensor data indicating an interaction associated with the simulated reality environment, the sensor data obtained at a sampling rate;
determining, by the processor and based on the interaction, whether to output a static haptic effect or a dynamic haptic effect;
responsive to determining to output a dynamic haptic effect, iteratively during the interaction substantially in real time and substantially at the sampling rate:
determining, by the processor and using the obtained sensor data, based on the one or more parameters of the dynamic haptic effect;
generating one or more haptic signals associated with the dynamic haptic effect; and
transmitting, by the processor, the one or more haptic signals associated with the dynamic haptic effect to a haptic output device to output the dynamic haptic effect in substantially real time.

10. The method of claim 9, further comprising:
receiving, by the processor, a sensor signal indicating information about a user; and
determining, by the processor, whether to output the dynamic haptic effect based at least in part on the sensor signal, wherein the one or more haptic signals associated with the dynamic haptic effect are based on the dynamic haptic effect.

11. The method of claim 10, further comprising:
determining, by the processor and based on the one or more parameters of the dynamic haptic effect, that the dynamic haptic effect is a periodic dynamic haptic effect, wherein the periodic dynamic haptic effect is based on a periodic waveform, and the one or more haptic signals associated with the dynamic haptic effect are based on the periodic waveform.

12. The method of claim 10, further comprising:
determining, by the processor and based on the one or more parameters of the dynamic haptic effect, that the dynamic haptic effect is an aperiodic dynamic haptic effect, wherein the aperiodic dynamic haptic effect is based on an aperiodic waveform, and the one or more haptic signals associated with the dynamic haptic effect are based on the aperiodic waveform.

13. The method of claim 9, further comprising:
determining, by the processor and based on the interaction, to output a static haptic effect, wherein the static haptic effect is a predetermined haptic effect, and one or more haptic signals are associated with the static haptic effect.

14. The method of claim 13, further comprising:
determining, by the processor, one or more parameters of the static haptic effect, wherein the static haptic effect is a periodic static haptic effect, the periodic static haptic effect is based on a periodic waveform, and the one or more haptic signals associated with the static haptic effect are based on the periodic waveform.

15. The method of claim 13, further comprising:
determining, by the processor, one or more parameters of the static haptic effect, wherein the static haptic effect is an aperiodic static haptic effect, the aperiodic static haptic effect is based on an aperiodic waveform, and the one or more haptic signals associated with the static haptic effect are based on the aperiodic waveform.

16. A non-transitory computer-readable medium comprising processor-executable program code configured to cause a processor to:
generate a simulated reality environment;
obtain sensor data indicating an interaction associated with the simulated reality environment, the sensor data obtained at a sampling rate;
determine, based on the interaction, whether to output a static haptic effect or a dynamic haptic effect;
responsive to a determination to output a dynamic haptic effect, iteratively during the interaction substantially in real time and substantially at the sampling rate:
determine, using the obtained sensor data, one or more parameters of the dynamic haptic effect;
generate one or more a-haptic signals associated with the dynamic haptic effect based on the one or more parameters; and
transmit the one or more haptic signals associated with the dynamic haptic effect to a haptic output device to output the dynamic haptic effect in substantially real time.

17. The non-transitory computer-readable medium of claim 16, wherein the processor is further configured to execute processor-executable program code stored in the non-transitory computer-readable medium to:
receive a sensor signal indicating information about a user; and
determine whether to output the dynamic haptic effect based at least in part on the sensor signal, wherein the one or more haptic signals associated with the dynamic haptic effect are based on the dynamic haptic effect.

18. The non-transitory computer-readable medium of claim 17, wherein the processor is further configured to execute processor-executable program code stored in the non-transitory computer-readable medium to: determine, based on the one or more parameters of the dynamic haptic effect, that the dynamic haptic effect is a periodic dynamic haptic effect or an aperiodic dynamic haptic effect, wherein the periodic dynamic haptic effect is based on a periodic waveform and the aperiodic dynamic haptic effect is based on an aperiodic waveform, and wherein the one or more haptic signals associated with the dynamic haptic effect are based on the periodic waveform or the aperiodic waveform.

19. The non-transitory computer-readable medium of claim 16, wherein the processor is further configured to execute processor-executable program code stored in the non-transitory computer-readable medium to: determine, based on the interaction, to output a static haptic effect, wherein the static haptic effect is a predetermined haptic effect, and one or more haptic signals are associated with the static haptic effect.

20. The non-transitory computer-readable medium of claim 19, wherein the processor is further configured to execute processor-executable program code stored in the non-transitory computer-readable medium to: determine one or more parameters of the static haptic effect, wherein the static haptic effect is a periodic static haptic effect or an aperiodic static haptic effect, the periodic static haptic effect is based on a periodic waveform and the aperiodic static haptic effect is based on an aperiodic waveform, and the one or more haptic signals associated with the static haptic effect are based on the periodic waveform or the aperiodic waveform.

* * * * *